April 20, 1943.  A. NIEDERMAYER  2,316,985
HANDLE
Filed July 21, 1941
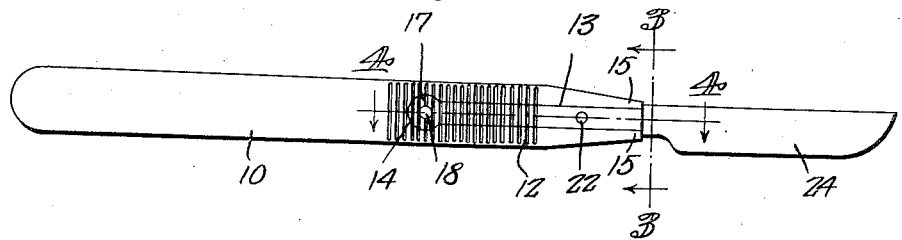
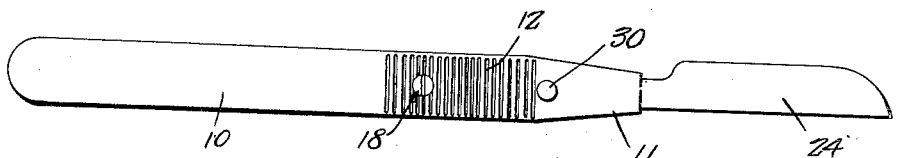
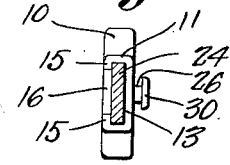
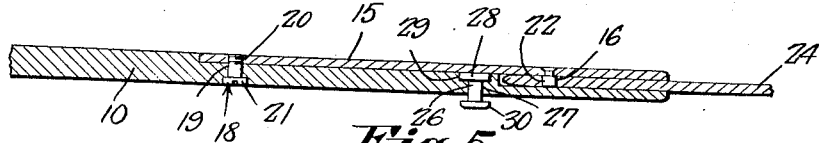
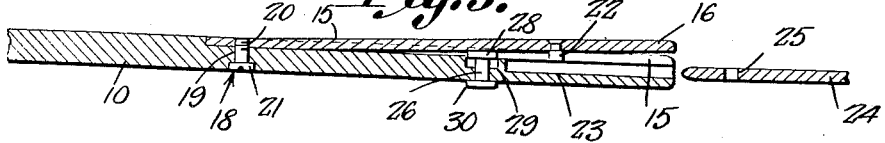
INVENTOR,
Anton Niedermayer.
BY
Victor J. Evans & Co.
ATTORNEYS Patented Apr. 20, 1943

2,316,985

UNITED STATES PATENT OFFICE 2,316,985

HANDLE

Anton Niedermayer, Philadelphia, Pa.

Application July 21, 1941, Serial No. 403,449

4 Claims. (Cl. 30—335)

This invention relates to handles more particularly designed for knives.

An object of the present invention is to provide a handle adapted to interchangeably receive knife blades such as dental blades, surgical blades, and other blades.

A further object is to provide a handle to which blades may be applied and detached without the use of tools.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter described and claimed, it being understood that various modifications may be resorted to within the scope of the appended claims without departing from the spirit or sacrificing any of the advantages of the invention.

In the accompanying drawing forming a part of this specification:

Figure 1 is a side elevation of a knife handle constructed in accordance with the invention showing a knife blade applied thereto.

Figure 2 is a rear elevation of the handle shown in Figure 1.

Figure 3 is a cross sectional view taken on the line 3—3 of Figure 1.

Figure 4 is a longitudinal sectional view, drawn to large scale, taken on the line 4—4 of Figure 1.

Figure 5 is a view similar to Figure 4 but showing the handle in condition for applying or removing a blade.

Referring now to the drawing in which like characters of reference designate similar parts in the various views, 10 designates a handle which may be formed of any suitable material and which is provided with a reduced front end 11. The handle is roughened as shown at 12 near the reduced end to provide a good grip for the operator's fingers. The handle is provided with a longitudinal groove 13 which extends from the tip of the reduced end to a point beyond the roughened portion of the handle and is formed at the rear end with a circular extension 14. The groove is slightly less in width than the width of the tip of the reduced end 11 of the handle so that a pair of lips 15, see Figure 3, extend from the side of the handle in which the groove is formed to provide stops for retaining a blade in the handle, as will be presently explained.

A leaf spring 16 is disposed in the groove 13 and is of less width than the groove so as to lie with its longitudinal edges against the lips 15. The leaf spring is provided at the rear end with a circular enlargement 17 which snugly fits in the circular extension 14 of the groove. A screw 18 is engaged in an opening 19 formed in the handle on the opposite side thereof from the groove, see Figure 4, and is threadedly engaged in a threaded opening 20 formed in the circular enlargement 17 of the leaf spring to secure the leaf spring at its rear end to the handle. The head 21 of the screw is countersunk in the handle.

The free end of the leaf spring is provided with a pin 22 which projects into an uniformly deepened portion of the groove in the reduced end 11 of the handle. The deepened portion of the groove forms a socket 23 adapted to interchangeably receive the shanks of a plurality of blades, one of which is shown at 24.

The shank of each blade is provided with an opening 25 to receive the pin 22 when the shank of the blade is inserted in the handle socket 23. The pin prevents endwise accidental dislodgement of the blades while the lips 15 prevent the blade being accidentally dislodged laterally from the handle.

A push pin 26 is slideably mounted in an opening 27 formed in the side of the handle opposite the longitudinal groove 13. The pin is provided at the inner end with a head 28 which is received in a countersink 29 at the inner end of the opening 27, and a head bears against the underneath face of the leaf spring 16. The outer end of the spring is provided with a button 30 which is disposed exteriorly of the handle.

As shown in Figure 5 to apply or remove a knife blade or other tool having a shank constructed as above described, the push pin 26 is manually pushed in to deform the free end of the leaf spring 15 outwardly so that the pin 22 is withdrawn from the socket 23 of the handle. The shank of the blade may now be inserted from the groove whereupon the push pin 26 may be released and is immediately returned to its blade locking position by the return movement of the leaf spring to normal position between the lips 15 due to the resiliency of the leaf spring.

From the above description it is thought that the construction and operation of the invention will be fully understood without further explanation.

What is claimed is:

1. A knife handle having a longitudinal groove in one side, opening through the front end of the handle and deepened at the front end to form a blade shank receiving socket, a leaf spring fixed at its rear end to the handle and received in said groove, means on the free end of the leaf spring for releasably locking a blade shank in said socket, and means for deforming the free end of the leaf spring out of the groove to release the locking means from a blade shank.

2. The structure as of claim 1 and in which the first named means comprises a pin projecting from the leaf spring and receivable in an opening in the blade shank.

3. The structure as of claim 1 and in which the second named means comprises a push pin engaged in an opening in the handle and bearing against the leaf spring.

4. A handle having a longitudinal groove in one side opening through the front end of the handle and provided with longitudinal lips forming stops, said groove being deepened at the front end to form a blade shank receiving socket, a leaf spring fixed at its rear end to the handle and received in said groove between said stops, said stops extending over said socket and preventing lateral dislodgement of a blade shank from said socket, means on the free end of the leaf spring for releasably locking a blade shank against endwise dislodgement from said socket, and means for deforming the free end of the leaf spring out of the groove to release the locking means from a blade shank.

ANTON NIEDERMAYER.